Jan. 8, 1946.  E. E. WALLACE  2,392,439
AIRPLANE
Filed Aug. 27, 1942  4 Sheets-Sheet 4
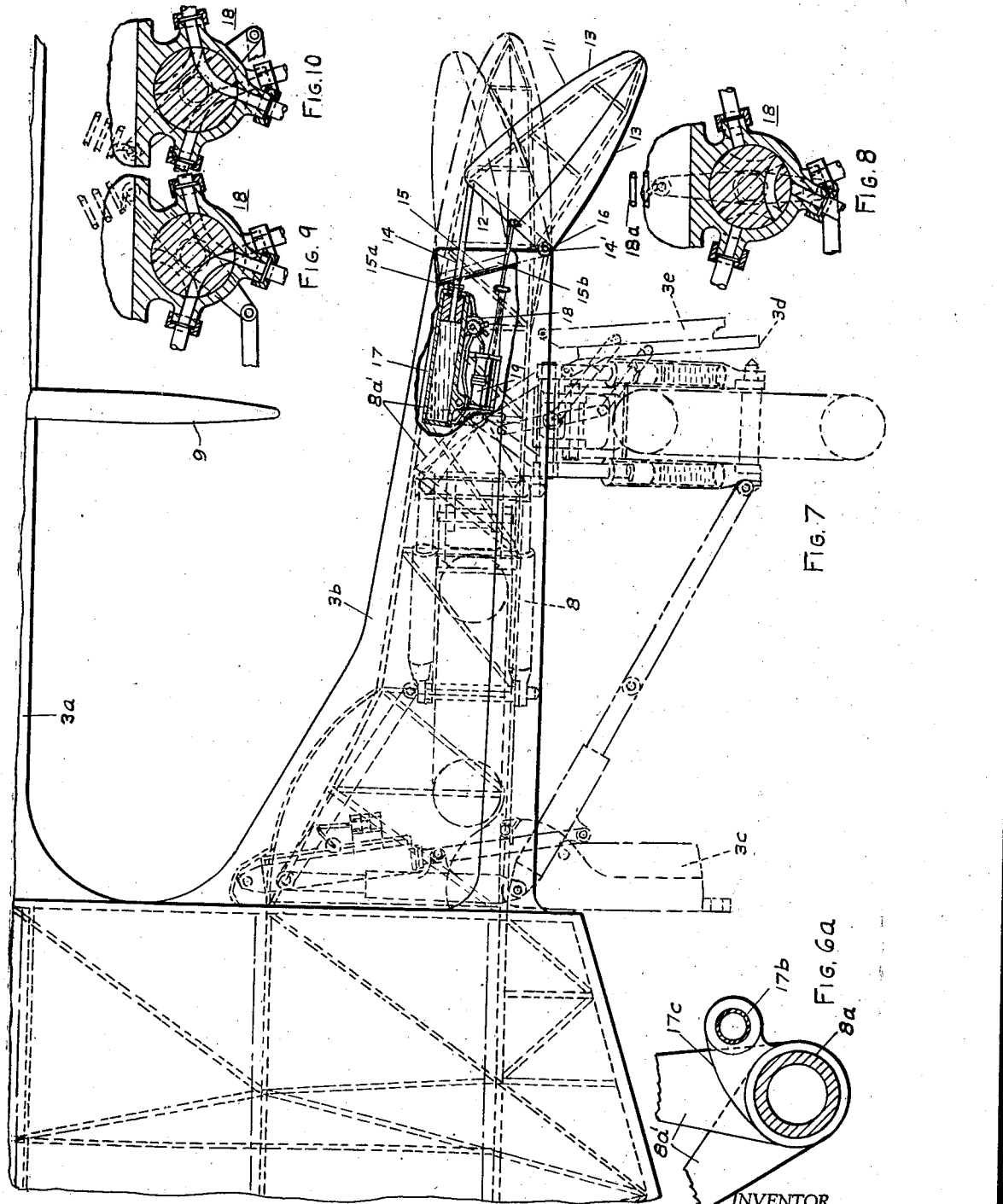
INVENTOR.
Edward E. Wallace
BY
Geo. B. Pitts attorney Patented Jan. 8, 1946

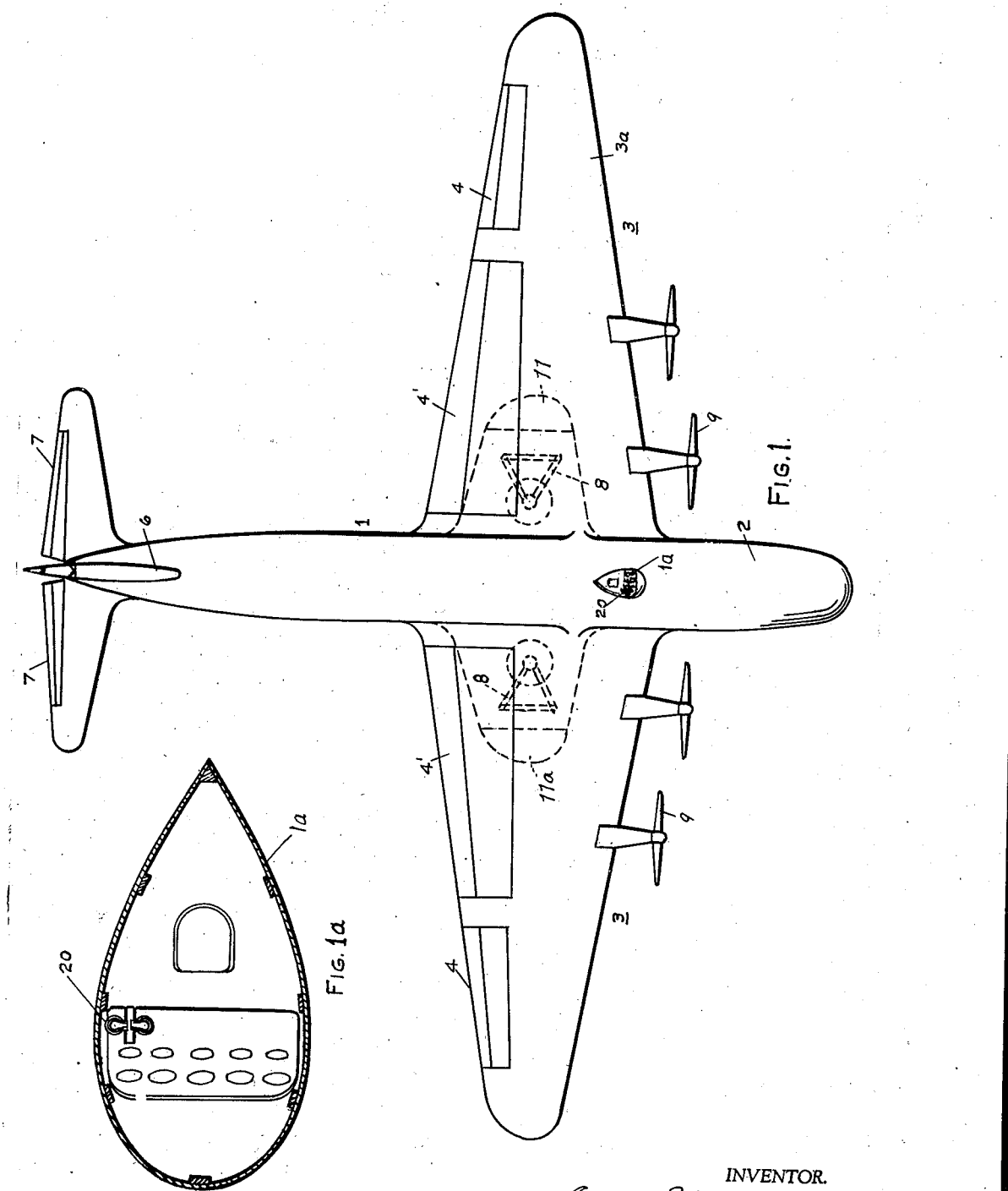

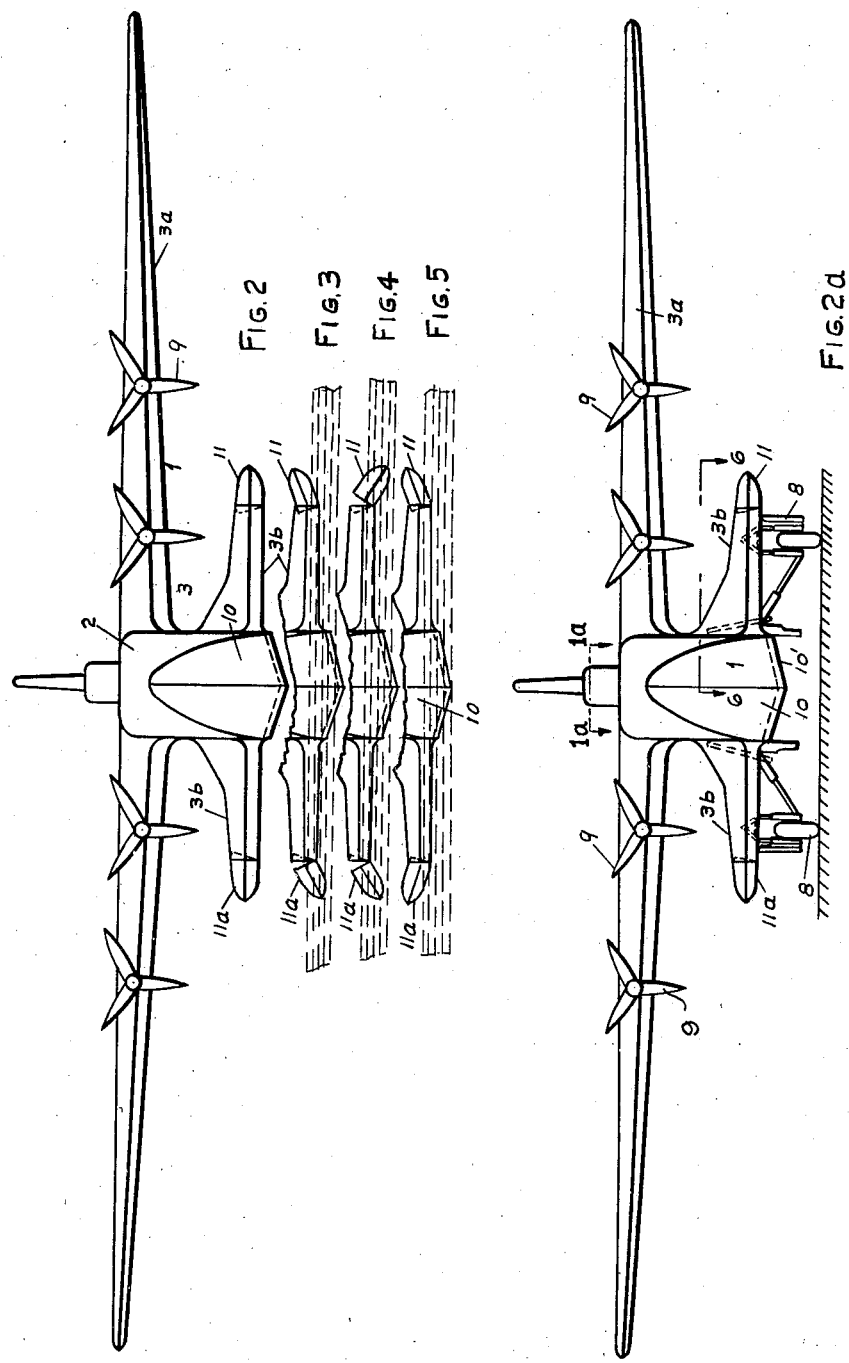

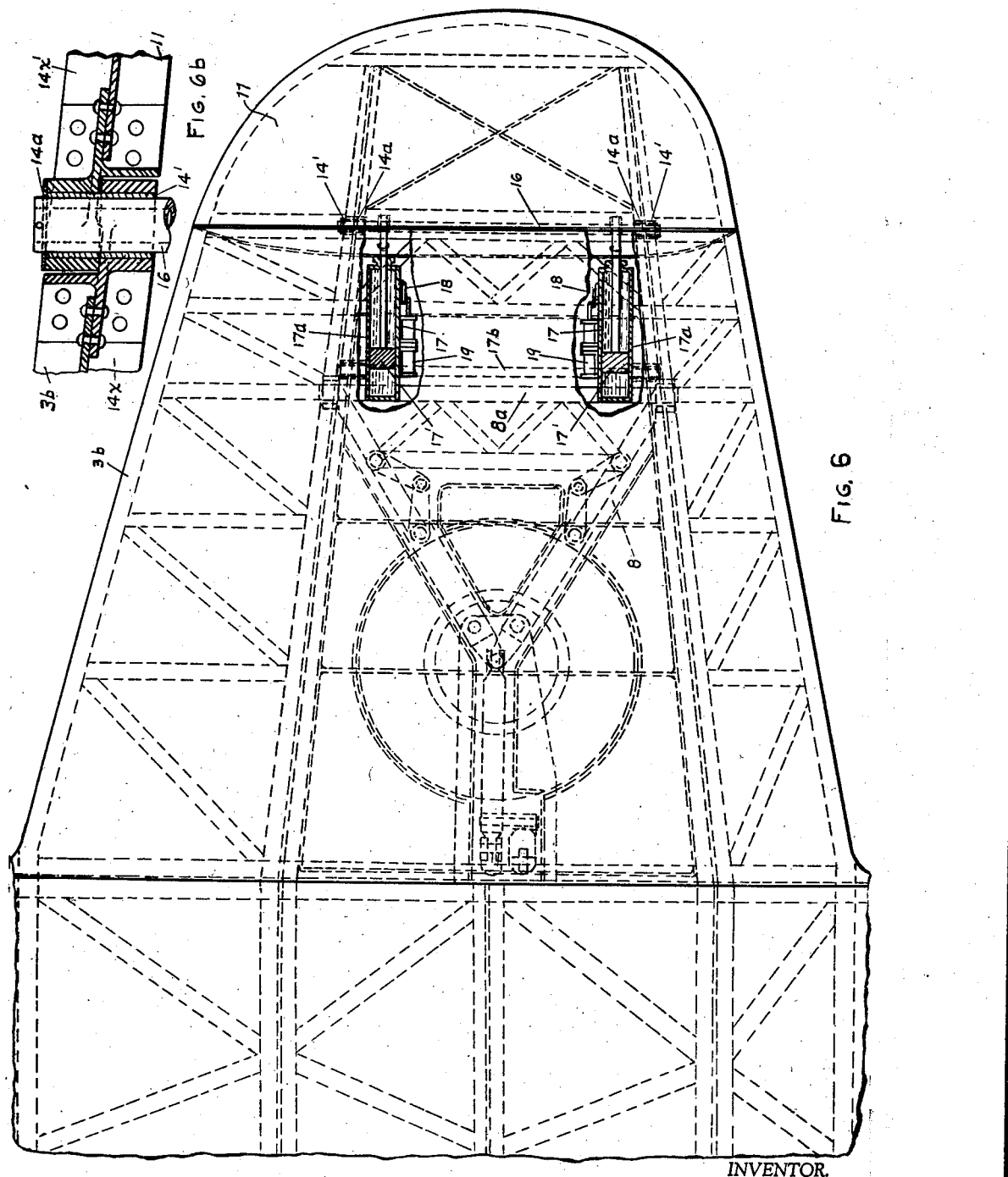

2,392,439

UNITED STATES PATENT OFFICE 2,392,439

AIRPLANE

Edward E. Wallace, Cleveland Heights, Ohio

Application August 27, 1942, Serial No. 456,340

8 Claims. (Cl. 244—50)

This invention relates to an airplane.

One object of the invention is to provide an improved airplane wherein the wing structures are provided with swingable members at their outer ends capable of being moved downwardly, when the airplane has entered the water in making a landing to increase the drag, or is at rest or in motion in water to stabilize the airplane.

Another object of the invention is to provide an improved airplane having means for intercepting rolling thereof due to wave motion when the airplane is at rest or in motion in water, whereby its occupants will be at ease at all times.

Another object of the invention is to provide an improved airplane constructed to execute on water relatively short radius turns where the forward speed of the airplane is slow or fast and to control the airplane in maneuvering in water in small areas and where obstructions and movable bodies are to be cleared to avoid damages.

Another object of the invention is to provide an airplane of the sesque amphibian type having means for effecting drag between the sponsons and water, after the sponsons enter the water, to decrease speed in landing, for facilitating take-offs from water and provide for maneuvering and turning of the airplane when floating in water.

Another object of the invention is to provide in an airplane of the sesque amphibian type sponsons, each having at its outer end a member which is swingable upwardly or downwardly into angular relation to the adjacent sponson, said members (a) when operated downwardly after the sponsons enter the water in making a landing serving to effect drag, whereby the speed of the airplane is reduced and (b) when operated upwardly serving to relieve drag in making a take-off; and either one of said members when operated downwardly being adapted to effect steering of the airplane when taxiing in water.

Other objects of the invention will be apparent to those skilled in the art to which my invention relates from the following description taken in connection with the accompanying drawings.

It will be understood that my invention may be applied to various types of seaplanes, amphibians or flying boats, including monoplanes, but for the purpose of illustrating one embodiment of the invention it is shown as applied in a sesque amphibian type of airplane.

Fig. 1 is a plan view of an airplane embodying my invention.

Fig. 1a is a section on the line 1a—1a of Fig. 2, enlarged.

Fig. 2 is a front elevation, the landing gears being in inoperative position enclosed in the sponsons.

Fig. 2a is a view similar to Fig. 2, but showing the landing gears in operative position engaging a surface other than water.

Figs. 3, 4 and 5 are fragmentary front elevational views of the sponsons, showing their stabilizing members in different positions.

Fig. 6 is a fragmentary section on the line 6—6 of Fig. 2a (enlarged), the top wall of the sponson being broken away and the fluid operating means for the adjacent stabilizer being shown in section.

Figs. 6a and 6b are fragmentary sections showing certain details.

Fig. 7 is a front elevational view of parts shown in Fig. 6, the front walls of the sponson being broken away and the fluid operating means being shown in section.

Fig. 8 is a fragmentary section of the valve when in closed position.

Figs. 9 and 10 are views similar to Fig. 8, but showing the position of the valve when moved to open position in either direction.

In the drawings, 1 indicates as an entirety an airplane comprising a fuselage 2, wing structures 3 at opposite sides of the fuselage, ailerons 4, flaps 4', a rudder 6, elevators 7, landing gears 8 and propellers 9 driven by one or more suitable motors (not shown). In the illustrated type of airplane, each wing structure consists of a wing 3a and a sponson 3b, the latter being constructed to house the adjacent landing gear 8 (see Figs. 2, 6 and 7), whereby landings on and take-offs from water may take place. In the form of airplane disclosed, it is designed to have a gross weight of 400,000 pounds. The airfoil span is approximately 260 feet, the overall length approximately 185 feet and a height (when the landing gears are in operative position—see Fig. 2a) approximately 45 feet; accordingly, this size of airplane makes it necessary to provide it with more than one engine, for which reason I have shown mounted on each airfoil 3a two propellers 9, which may be drivingly connected to one engine or each propeller driven by one or more engines; the engine or engines also being suitably mounted in the adjacent airfoil 3a or adjacent thereto.

It will be understood that the airplane may be of any desired size and that the number of engines required will depend upon the size of the plane and other factors.

The parts above referred to, except the sponsons 3b, may be of any desired shape and form of construction and the engines and propellers may be variously mounted, as they form no part of the present invention. As will be apparent, (a) the engines, (b) controls for and connections to the elevators 7, rudder 6, ailerons 4 and the engines, (c) flying instruments, such as gages and the like and (d) gas and oil tanks, pumps and electrical and other equipment, are not shown as these parts, accessories and equipment may be of any well known construction and form no part of the present invention.

The construction of the landing gears, their operating mechanisms and housing thereof form the subject-matter of my co-pending application Serial No. 431,102, filed February 16, 1942.

As shown in Figs. 2, 3, 4 and 5, the lower portion of the fuselage is constructed to provide a hull 10 the bottom wall of which preferably consists of inclined portions 10' extending from the lateral sides or chines of the hull 10 downwardly and inwardly to the keel forming a V-shaped bottom.

Each sponson 3b is fixedly related to the hull 10 and is (a) provided interiorly with a compartment or chamber opening downwardly, but closed by doors 3c, 3d, 3e, to house the adjacent landing gear 8 (see dotted lines in Fig. 7), when landing on and taking off from water and when the plane is in flight as set forth in my aforesaid application and (b) suitably reinforced and braced interiorly in any desired manner. The reinforcing and bracing structure for each sponson forms no part of the present invention.

11, 11a, indicate members pivotally mounted on the outer ends of the sponsons 3b and swingable upwardly and downwardly relative thereto and arranged to stabilize the airplane when floating in water under various conditions. Each stabilizing member 11, 11a, when in normal position, is disposed in the plane of the adjacent sponson 3b and forms an extension thereof (see Figs. 1, 2, 2a and 6) and co-operates therewith when the airplane is at rest in a body of water to float and maintain it in a state of equilibrium and to counteract shift in weight to either side of the center of gravity of the airplane. However, when the water is rough, that is, in wave motion, the stabilizing members 11, 11a, may be swung downwardly, as shown in Figs. 4 and 7, the effect of which is to counteract the wave motion and prevent undue rolling motion of the airplane. Likewise, when the airplane is making a landing in water, and the sponsons have entered the water, the stabilizing members 11, 11a, may be swung downwardly (see Fig. 4), the effect of which is to retard the speed of the airplane in bringing it to a state of rest.

When taking off from water, the stabilizing members 11, 11a, may be swung upwardly, as shown in Fig. 5, to reduce drag. When the airplane is being taxied or maneuvered in water in a direction other than straight ahead, one of the stabilizing members may be swung downwardly to co-operate with the rudder 6 whereby steering may be carried out on a radius shorter than in the operation of the rudder alone. Under these latter conditions one member may be swung downwardly and the other member swung upwardly (see Fig. 3), the latter member when in this position serving to reduce the drag. Thus it will be observed that in turning the airplane in water on a short radius the submerged member serves as a pivot and co-acts with the rudder to effect the turning or steering operation and enables the turning to be effected with precision.

Accordingly, it will be seen that the airplane may be maneuvered in small areas and where crowded conditions prevail without danger of damage to the airplane.

It will be observed that by operation of one stabilizer member downwardly, steering of the airplane may be carried out without the use of the rudder; this adaptability of the stabilizing members for turning or steering without the operation of the rudder, makes it possible to maneuver the airplane on water at slow speed and hence under conditions where the airplane rudder would be totally ineffective.

Each stabilizing member 11, 11a, comprises a fabricated structure having an inner end wall 12 and outer walls 13. By preference each stabilizing member has a width equal to that of the outer end of the adjacent sponson and correspondingly shaped, so that its outer walls register with the outer walls of the adjacent sponson 3b when the adjacent stabilizing member is in normal position (see Figs. 2 and 2a). When in normal position, the members 11, 11a, supplement the buoyancy of the sponsons 3b. The length of the members 11, 11a, will depend upon the type of wing structure, length of wing span and other factors. The walls 12 and 13 are interiorly reinforced in any desired manner as shown in dotted lines (see Figs. 6 and 7). The end wall of each stabilizing member is pivotally connected at its lower end to the lower side of the adjacent sponson 3b and the latter is provided with a pocket 14, which closes the outer end of the sponson 3b, to accommodate the inner end of the stabilizing member when the latter is swung upwardly (see dotted lines in Fig. 7). The pocket consists of an inner wall 15 suitably secured to and extending from the outer end of the bottom wall of the sponson 3b upwardly and inwardly, an upper wall 15a extending from the upper end of the inner wall 15 upwardly and outwardly and terminating at the outer end of the top wall of the sponson 3b, being secured thereto in any suitable manner, and end walls 15b suitably secured to the walls 15, 15a, and side walls of the sponson 3b. The spaced struts 14x adjacent the bottom wall of each sponson 3b are extended outwardly beyond the wall 15 and are provided with hollow bosses in which are mounted bushings 14' and spaced struts 14x' of the bottom wall of the adjacent stabilizing member extend inwardly and are provided with hollow bosses, in which are mounted bushings 14a each in registry with and adjacent to one of the bushings 14', the bushings 14', 14a, serving to support a shaft 16 to pivotally mount the stabilizing member on the sponson 3b.

Operating means indicated as an entirety at 17 are provided for holding each stabilizing member in normal position and for moving it in either direction to its extreme or any intermediate position and from any operated position at one side of its normal position to any predetermined position at the opposite side thereof. Any suitable means may be employed for operating the stabilizing members separately or together, for example, operating means such as shown and claimed in my co-pending application filed August 22, 1942. These means include a fluid operated piston 17' connected to each stabilizing member and mounted in a cylinder 17a having fluid and discharge connections at its opposite ends, the cylinder 17a being preferably pivotally mounted on a transverse shaft 17b, which is supported on brackets 17c (one being shown in Fig. 6a). The brackets 17c are supported on the shaft 8a, about which the adjacent landing gear 8 swings, the shaft 8a being supported by bracing members 8a'. The supply of the fluid to and from the cylinder 17b is controlled by a valve 18 (see Figs. 8, 9 and 10). The valve 18 is preferably normally held in closed position by a spring 18a and operated to either open position by a double acting solenoid 19, the operation of which is initially controlled by a lever 20 mounted in the cock-pit 1a (see Fig. 1a). As the construction of the operating means 17 forms no part of the present invention, but forms the subject-matter, in part, of the aforesaid application further description and disclosure thereof is not required.

It will be noted that I provide an operating means for each stabilizer 11, 11a, and mount the manually operated levers 20 therefor in side by side relation in the cock-pit 1a, whereby they are in convenient assembled relation for operation separately or simultaneously for effecting operation of either or both of the stabilizing members upwardly or downwardly, or one upwardly and the other downwardly, as desired.

From the foregoing description it will be observed that the stabilizing members may be employed advantageously under varying conditions, to operate as a brake or resistance following a landing in water, to reduce drag in take-offs, to steer the airplane or co-act with the airplane rudder when maneuvering in water, to compensate for wave motion and wind to prevent undue rolling when at rest in water and when calm conditions exist in the water to increase the buoyancy of the sponsons.

To those skilled in the art to which my invention relates many changes in construction and widely differing embodiments and applications of the invention will suggest themselves without departing from the spirit and scope of the invention. My disclosures and the description herein are purely illustrative and are not to be in any sense limiting.

It will be observed that where the operating means 17 is similar to that disclosed in my aforesaid co-pending application, each stabilizing member may be operated to and locked in various predetermined positions, in a ready manner.

In the preferred form of construction the stabilizing members, when in normal position, form an extension of and become parts of the sponsons to increase the buoyancy thereof and in effect form sectional sponsons to insure symmetry as well as undue drag when the airplane is in flight.

What I claim is:

1. In an airplane having a hull and wing structures at opposite sides thereof, each wing structure comprising a wing and a sponson, a closed member hingedly connected to the outer end of each sponson on an axis parallel to the longitudinal axis of the hull and normally disposed in the plane thereof to supplement the buoyancy of said sponson and swingable vertically into an upwardly inclined position relative to the plane thereof and into a downwardly inclined position relative to the plane of said sponson, and means for operating each said member in either direction.

2. In an airplane having a hull and wing structures at opposite sides thereof, each wing structure comprising a wing and a sponson consisting of inner and outer sections normally disposed in end to end relation, said inner section being rigidly connected to the hull and closed at its outer end and said outer section comprising a closed member hingedly connected to the outer end of said inner section on an axis parallel to the longitudinal axis of the hull and swingable vertically into an upwardly inclined position relative to the plane thereof and into a downwardly inclined position relative to the plane of said sponson, and means for operating each member in either direction.

3. In an airplane having a hull and wing structures at opposite sides thereof, each wing structure comprising a wing and a sponson, a closed member related to the outer end of each sponson and normally disposed in the plane thereof to supplement the buoyancy of said sponson and hingedly connected at its lower inner end to the lower wall of said sponson on an axis transverse thereto to swing vertically into an upwardly inclined position relative to the plane of the adjacent sponson and into a downwardly inclined position relative to the plane of the adjacent sponson, each sponson being closed at its outer end by a wall shaped to form a pocket for the upper end of said closed member when the latter is swung into an upwardly inclined position and the exterior walls of each said member, when the latter is in normal position, being arranged to coincide with the exterior walls of the adjacent sponson to form an extension of the latter, and means for swinging each said member in either direction.

4. In an airplane having a hull and wing structures at opposite sides thereof, each wing structure comprising a wing and a sponson closed at its outer end and having upper and lower walls, a closed member hingedly connected to one of said walls on an axis transverse to said sponson and swingable vertically into an upwardly inclined position relative to the plane of said sponson and into a downwardly inclined position relative to the plane of said sponson, and means for maintaining said member in the plane of said sponson and for swinging it relative thereto into said upwardly and downwardly inclined positions.

5. An airplane having a hull and wings at opposite sides of said hull and chambered sponsons for housing retractible landing gears at opposite sides of said hull, in combination with a closed combined stabilizing and maneuvering member on the outer end of each sponson normally disposed in the plane thereof and hingedly connected to said sponson on an axis transverse thereto to swing vertically into an upwardly inclined position relative to the plane of the adjacent sponson and into a downwardly inclined position relative to the plane of the adjacent sponson, and means for maintaining each said member in the plane of the adjacent sponson and for swinging it relative thereto into said upwardly and downwardly inclined positions.

6. In an airplane having a hull and wing structures at opposite sides thereof each comprising upper and lower members, one of said members at each side of the hull consisting of inner and outer sections normally disposed in end to end relation, the inner section being rigidly connected at its inner end to the hull and closed at its outer end and the outer section being hingedly connected to the outer end of said inner section on an axis transverse thereto and swingable vertically into an upwardly inclined position relative to the plane of the adjacent inner section and into a downwardly inclined position relative to the plane of the adjacent inner section, said outer section when in normal position serving to supplement the buoyancy of said wing structure and when in its downwardly inclined position and the hull is in contact with water, serving as a stabilizing and maneuvering device and when in its upwardly inclined position serving to eliminate drag during take-offs from water, and means for operating each of said outer sections.

7. In an airplane having a hull and wing structures at opposite sides thereof, each structure comprising a wing and a sponson, each sponson consisting of inner and outer sections normally disposed in end to end relation, said inner section being rigidly connected to the hull and said outer section being hingedly connected to said inner section and swingable into a downwardly inclined position relative to the adjacent inner section for projection in water so that when the hull is in contact with water, it is operable as a stabilizing and maneuvering device and swingable into an upwardly inclined position relative to the adjacent inner section out of the water to eliminate drag during take-offs of the airplane from water, and means for operating each of said outer sections.

8. An airplane having a hull, wings at opposite sides thereof, sponsons at opposite sides of said hull each comprising inner and outer sections normally disposed in end to end relation, the inner section being rigidly connected to said hull and closed at its outer end and the outer section consisting of a water-tight closed chamber hingedly connected at its inner end to the outer end of the inner sponson section and swingable vertically into an upwardly inclined position relative to the plane of the adjacent inner section, whereby drag is eliminated during take-offs of the airplane from water and swingable vertically into a downwardly inclined position relative to the plane of said inner sponson section, whereby drag is effected to reduce the speed of the airplane during landing thereof in water, and means for operating each outer section upwardly or downwardly.

EDWARD E. WALLACE.